United States Patent [19]

Navratil et al.

[11] Patent Number: 4,894,863
[45] Date of Patent: Jan. 16, 1990

[54] METHOD FOR GAIN CONTROL IN TELEPHONE SETS HAVING AN ELECTRONIC SPEECH CIRCUIT, AND APPARATUS FOR PERFORMING THE METHOD

[75] Inventors: Emil Navratil; Armin Doll, both of Munich, Fed. Rep. of Germany

[73] Assignee: Siemens Aktiengesellschaft, Berlin and Munich, Fed. Rep. of Germany

[21] Appl. No.: 103,385

[22] Filed: Sep. 30, 1987

[30] Foreign Application Priority Data

Sep. 30, 1986 [DE] Fed. Rep. of Germany ....... 3633232

[51] Int. Cl.⁴ .............................................. H04M 1/60
[52] U.S. Cl. .................................... 379/395; 379/387
[58] Field of Search ............... 379/395, 387, 391, 392, 379/398, 399, 394, 390, 388; 381/77, 93, 94, 95, 104, 106, 107, 108, 111, 120, 121, 122, 112, 113, 114, 115

[56] References Cited

U.S. PATENT DOCUMENTS

| | | | |
|---|---|---|---|
| 3,786,200 | 1/1974 | Camenzind | 381/112 X |
| 4,453,038 | 6/1984 | Eberhardt et al. | 379/395 |
| 4,515,996 | 5/1985 | Burgin | 379/395 X |

FOREIGN PATENT DOCUMENTS

| | | |
|---|---|---|
| 0114319 | 8/1986 | European Pat. Off. . |
| 0191619 | 8/1986 | European Pat. Off. . |
| 1928671 | 12/1970 | Fed. Rep. of Germany . |
| 2638286 | 3/1978 | Fed. Rep. of Germany . |

OTHER PUBLICATIONS

"Versatile Telephone Transmission Circuits with Dialler Interface", Phillips Develepment Sample Data, TEA 1060, 1061, Aug. 1983, pp. 393-406.

Primary Examiner—Jin F. Ng
Assistant Examiner—Randall Vaas
Attorney, Agent, or Firm—Herbert L. Lerner; Laurence A. Greenberg

[57] ABSTRACT

A method for gain control of telephone sets having an electronic speech circuit and an apparatus for carrying out the method include a modulation current source. Two line terminals connect the modulation current source to a telephone line. A microphone amplifier has an input connected to a microphone terminal and an output controlling the modulation current source for generating a line signal. Signals are derived from the modulation current source and converted into mutually associated measurement signals and threshold value signals. The mutually associated measurement and threshold value signals are compared with one another. The gain of the microphone amplifier is regulated as a function of the result of the comparison.

27 Claims, 2 Drawing Sheets

METHOD FOR GAIN CONTROL IN TELEPHONE SETS HAVING AN ELECTRONIC SPEECH CIRCUIT, AND APPARATUS FOR PERFORMING THE METHOD

The invention relates to a method for gain control of telephone sets having an electronic speech circuit and an apparatus for performing the method, including a modulation current source connected through a total of two line terminals to a telephone line, and a microphone amplifier having an input connected to a microphone terminal and an output controlling the modulation current source for generating a line signal.

In telephone sets having an electronic speech circuit, high microphone transmission levels or unfavorable feed and load conditions, such as low feed currents or extreme load impedances, can cause signal limitations because of overmodulation, thereby greatly increasing signal distortion.

In order to prevent overmodulation, it is conventional to limit the maximum amplitude of the line signal on the telephone line to a fixed value, taking unfavorable operating conditions into account. In so doing, either the amplitude peaks of the line signal symmetrically kept below the maximum amplitude value by means of a continuously progressively increasing limitation at higher amplitude, or the transmission gain is retracted if a preselected transmission level is exceeded.

The disadvantage of both solutions is that the preselected maximum amplitude levels are fixed values that are defined by the particular unfavorable operating conditions in question. On one hand, during normal operation or in other words when feed and load conditions are more favorable, the possible amplitude range is not fully exploited. On the other hand, overmodulation of the speech circuit, under particularly unfavorable operating conditions, cannot be precluded completely. Limitation of the amplitude peaks has the further disadvantage of causing the line signal, in comparison with the microphone signal, to exhibit reduced dynamics and harmonic components that cannot be ignored.

It is accordingly an object of the invention to provide a method for gain control in telephone sets having an electronic speech circuit and an apparatus for performing the method, which overcomes the hereinafore-mentioned disadvantages of the heretofore-known methods and devices of this general type and in which a possible signal limitation resulting from overmodulation is avoided.

With the foregoing and other objects in view there is provided, in accordance with the invention, in a telephone set having an electronic speech circuit, including a modulation current source, two line terminals connecting the modulation current source to a telephone line, and a microphone amplifier having an input connected to a microphone terminal and an output controlling the modulation current source for generating a line signal, a method for gain control which comprises deriving signals from the modulation current source and converting the signals into mutually associated measurement signals and threshold value signals, comparing the mutually associated measurement and threshold value signals with one another, and regulating the gain of the microphone amplifier as a function of the result of the comparison.

In accordance with another mode of the invention, there is provided a method which comprises deriving the measurement signals from the line signal in the form of current or voltage measurement signals.

In accordance with a further mode of the invention, there is provided a method which comprises deriving the measurement signals from the current and the voltage of the telephone line or from the output voltage and the output current of the modulation current source.

In accordance with an added mode of the invention, there is provided a method which comprises deriving the threshold value signals as a function of the amplitude limits of the electronic speech circuit in the form of threshold value current signals or threshold value voltage signals.

In accordance with an additional mode of the invention, there is provided a method which comprises deriving the threshold value signals as a function of at least one of the current and/or voltage of the telephone line as threshold value signals for upper and lower amplitude limits of the electronic speech circuit.

In accordance with yet another mode of the invention, there is provided a method which comprises deriving the threshold value signals as fixed signals for amplitude limits of the electronic speech circuit.

In accordance with yet a further mode of the invention, there is provided a method which comprises defining the threshold value signals by fixed voltage sources.

In accordance with yet an added mode of the invention, there is provided a method which comprises reducing the gain of the microphone amplifier with the aid of a regulating device as soon as the measurement signals drop below or exceed the respectively associated threshold value signals and vice versa.

In accordance with yet an additional mode of the invention, there is provided a method which comprises reducing the gain of the microphone amplifier with a time delay element as soon as the measurement signals drop below or exceed the respectively associated threshold value signals.

With the objects of the invention in view there is also provided an apparatus for gain control of telephone sets having an electronic speech circuit, comprising a modulation current source, two line terminals connecting the modulation current source to a telephone line, a microphone terminal, a microphone amplifier having an input connected to the microphone terminal and an output connected to and controlling the modulation current source for generating a line signal, means connected to the modulation current source for generating mutually associated measurement signals and threshold value signals, a comparison device connected to the generating means for comparing the mutually associated measurement signals and threshold value signals with one another, and a regulating device connected to the comparison device and to the microphone amplifier for regulating the gain of the microphone amplifier as a function of the comparison device.

In accordance with another feature of the invention, the generating means for the measurement signals detect the line signal and generate current or voltage measurement signals.

In accordance with a further feature of the invention, the generating means for the measurement signals detect the current and voltage of the telephone line or the output voltage and the output current of the modulation current source.

In accordance with an added feature of the invention, the generating means for the threshold value signals generate threshold value current signals or threshold value voltage signals dependent on amplitude limits of the speech circuit.

In accordance with an additional feature of the invention, the generating means for the threshold value signals fix upper and lower amplitude limits of the speech circuit as a function of at least one of current and/or voltage of the telephone line.

In accordance with yet another feature of the invention, the generating means for the threshold value signals define fixed amplitude limits of the speech circuit.

In accordance with yet a further feature of the invention, the generating means for the threshold value signals include fixed voltage sources.

In accordance with yet an added feature of the invention, the comparison device includes comparators or differential amplifiers having inputs respectively receiving the measurement signal and the threshold value signal.

In accordance with yet an additional feature of the invention, the modulation current source includes a transistor having an input circuit connected to and controlled by the microphone amplifier, an output circuit determining the line signal, and a base and a collector respectively connected to the inputs of one of the comparators or differential amplifiers.

In accordance with still another feature of the invention, the comparator or differential amplifier has an offset, and the modulation current source includes a current sensor resistor having terminals respectively connected to the inputs of the comparator or differential amplifier.

In accordance with still a further feature of the invention, the comparators or differential amplifiers have outputs, and the regulating device has an input side including a logic element connected to the outputs of the comparators or differential amplifiers and an output side including a control element connected to the logic element and to the microphone amplifier.

In accordance with still an added feature of the invention, the regulating device includes a delay circuit connected between the logic element and the control element.

In accordance with a concomitant feature of the invention, there is provided a rectifier connected between the delay device and the logic element.

The invention provides the advantage of ensuring that the maximum possible amplitude range determined by the feed and load conditions can always be optimally exploited, because the control which is provided prevents the signal level from going outside the range.

Other features which are considered as characteristic for the invention are set forth in the appended claims.

Although the invention is illustrated and described herein as embodied in a method for gain control in telephone sets having an electronic speech circuit and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
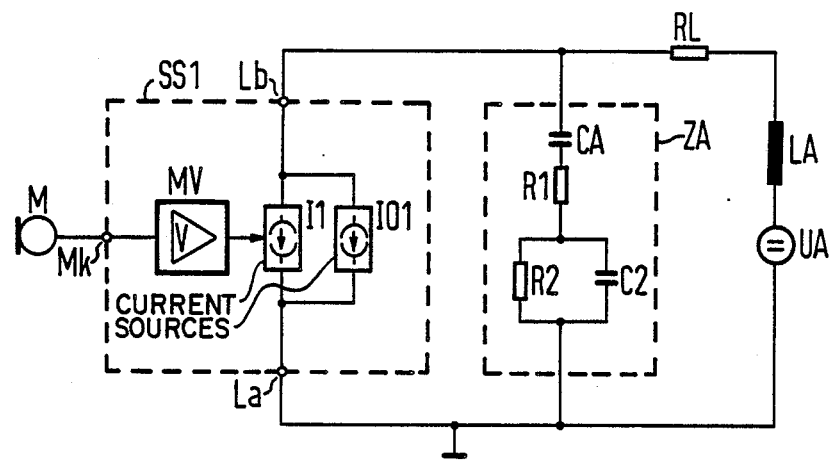
FIG. 1 is a schematic and block circuit circuit diagram of a telephone system.

Referring now to the figures of the drawings in detail and first, particularly, to FIG. 1 thereof, there is seen a subscriber unit having a speech circuit configuration SS1 connected through connection terminals La and Lb to a telephone line for central exchange feeding. For the sake of simplicity, FIG. 1 shows an asymmetrical feed and line configuration. The speech circuit configuration SS1 includes a microphone amplifier MV. The input side of the microphone amplifier MV is connected through a microphone terminal Mk to a microphone M and the output side controls a modulation current source I1. A direct current which is required for maintaining the functional capacity of the speech circuit configuration SS1 flows through a zero signal current source IO1 connected parallel to the modulation current source I1.

A central exchange is represented by a feed voltage source UA and an inductance LA. The speech circuit configuration SS1 is connected to the central exchange through a telephone line symbolized by an equivalent line resistor RL. A network ZA, which symbolizes the impedance of the line, is connected parallel to the series circuit of the elements UA, LA and RL. The line "sees" the speech circuit configuration SS1 at the two terminals La, Lb. The network ZA includes a series circuit of a capacitor CA, a resistor R1 and a parallel circuit including a resistor R2 and a capacitor C2. In the equivalent or substitute circuit diagram of FIG. 1, the inductance LA means that the line resistance RL influence only is the direct-current mode of the configuration, and the capacitance CA means that the complex impedance of the network ZA only influences the alternating-current mode of the configuration. The magnitude of the line current of the telephone line depends on the central exchange feed voltage source UA, the central exchange resistance, the DC line resistance RL and the DC subscriber resistance.

The modulation current source I1, which is shown as a current source of the speech circuit configuration SS1, generates a DC current value which corresponds to the difference in line current of the telephone line and the zero signal current source IO1. In the event that the modulation current source I1 is triggered with the microphone M or the microphone amplifier MV, an alternating current is superimposed on this direct current.

The limits of the linear amplitude range are apparent from the circuit diagram of FIG. 1.

The electronic speech circuit configuration SS1, which generates the line signal as a source current of the modulation current source I1 modulated by the microphone M, has attained the maximum value of the line signal whenever it is no longer possible to further raise the voltage at the terminals La and Lb by reducing the current through the modulation current source I1. This maximal value depends on the voltage of the voltage source UA as well as on the effective load impedance, which according to FIG. 1 is a combination of the resistance RL and the impedance of the network ZA. This threshold value, at which the modulation current through the modulation current source I1 in the extreme case is equal to 0, is called the positive threshold value.

A second threshold value, called a negative threshold value, results from the fact that with full amplitude, the electronic speech circuit configuration SS1 requires a minimum voltage at the output or connection terminals La and Lb thereof, for instance the saturation voltage of a transistor, below which the voltage may fall, such as if there is a change in voltage on the telephone line.

According to the invention, measurement signals and threshold value signals which are generated by an electronic speech circuit, characterize the instantaneous line signal and threshold values for the amplitude limits. The gain of the microphone amplifier is regulated downward with the aid of a regulating device, by comparing the signals upon attaining the amplitude limits. The type that these signals are, that is whether they are current or voltage signals, as well as the type and manner of the generation thereof, depend on the particular embodiment of the speech circuit configuration. They can be generated with means that are familiar in the art. The signal for the positive and negative threshold values may be fixed or may be dependent on the current or voltage status of the telephone line, in the event that the threshold values of the speech circuit configuration that characterize the amplitude limits are dependent on the current or voltage status of the telephone line.

Figure 2:
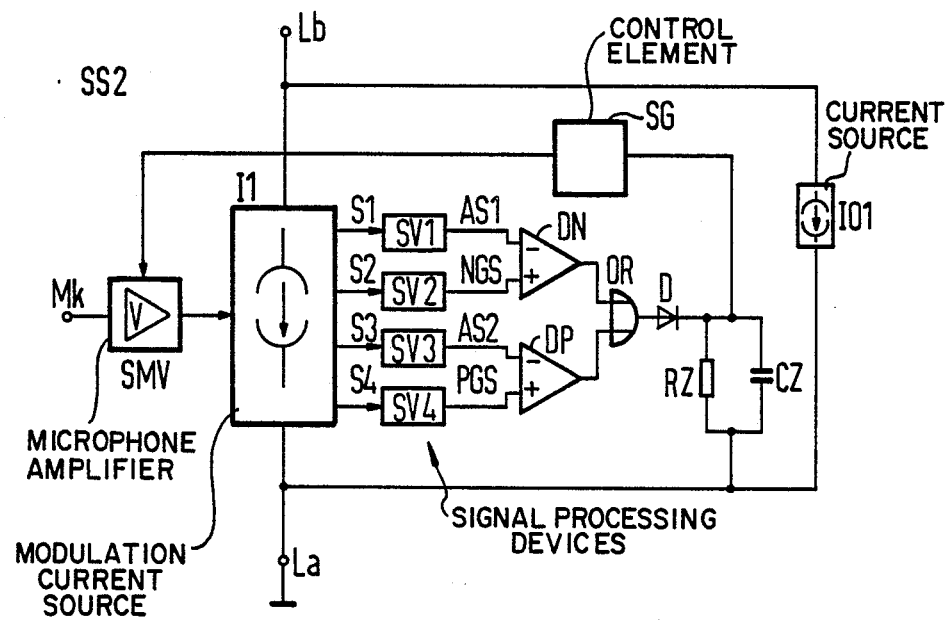
FIG. 2 is a schematic and block circuit diagram of an apparatus according to the invention.

In a speech circuit configuration SS2 according to the invention that is shown in the schematic circuit diagram of FIG. 2, elements which are identical to those of FIG. 1 are provided with the same reference numerals. In the speech circuit configuration SS2, a controllable microphone amplifier SMV has an input side connected to the microphone terminal Mk and an output side which controls the modulation current source I1. The output side of the modulation current source I1 is connected to the terminals La and Lb for connection to the telephone line. As in FIG. 1, the zero signal current source IO1 is connected to the terminals La and Lb.

Depending on the embodiment of the modulation current source I1, which is familiar to one skilled in the art and is known per se, signals S1-S4 are derived from the modulation current source and transmitted. After conversion by associated signal processing devices SV1-SV4, the signals S1 and S2 enable detection of the negative limitation by a comparator or differential amplifier DN, and the signals S3 and S4 enable detection of the positive limitation by means of a comparator or differential amplifier DP. This detection of the limitation is accomplished by forming instantaneous line signals AS1 and AS2 which characterize the instantaneous electrical state of the modulation current source by conversion from the signals S1 and S3, and by forming threshold value signals NGS and PGS after conversion from the signals S2 and S4. The threshold value signals characterize the maximum states permitted, or in other words correspond to the negative or positive threshold value of the amplitude range. The signals AS1 and NGS are compared with one another in the comparator DN, and the signals AS2 and PGS are compared with one another in the comparator DP.

The outputs of the two comparators DN and DP are fed to a regulating device, which regulates the gain of the controllable microphone amplifier SMV through an OR element OR, a diode D and a control element SG. The OR element OR is controlled by the outputs of the two comparators DN and DP. As a rule, a time delay element is also disposed between the diode D and the control element SG. As shown in FIG. 2, the time delay element may be formed of a resistor RZ and a capacitor CZ.

If the instantaneous line signals AS1 or AS2 attain the negative or positive threshold values of the amplitude range characterized by the threshold value signals NGS or PGS, then the comparators DN or DP trigger the regulating device in such a way that the gain of the controllable microphone amplifier SMV is regulated downward. Conversely, the gain of the controllable microphone amplifier SMV is increased again as soon as the instantaneous line signals AS1 and AS2 drop back below the respectively associated threshold value signals NGS and PGS.

The gain of the controllable microphone amplifier SMV depends on the voltage at the capacitor CZ. If the capacitor CZ is empty or discharged, the controllable microphone amplifier SV has a maximum gain. With increasing charge at CZ, the gain of the controllable microphone amplifier SMV decreases. The gain can assume any arbitrary value between 0 and the maximum gain. The function of the circuit according to FIG. 2 will be explained below, using the positive threshold value as an example. If the positive threshold value PGS is exceeded as a result of powerful triggering of the controllable microphone amplifier and unfavorable impedance conditions, then the comparator DP furnishes a signal for charging the capacitor CZ through the OR element OR, and this signal is high enough that the instantaneous line signal AS2 remains stopped at the positive threshold value PGS.

Upon retraction of the gain because of the voltage rise at the capacitor CZ, the signal AS2 and hence the charge current or the capacitor CZ in fact reverts to the original value.

The signals AS1, AS2, NGS and PGS characterizing the line signals and the threshold values of the triggering range are shown in FIG. 2 as voltages at the most-negative point of the circuit configuration SS2, namely the terminal La. However, it is equally possible to intervene in the gain of the controllable microphone amplifier SMV by regulating the current, in which case the characterizing signals for the line signals and the threshold value of the amplitude range must represent currents.

Figure 3:
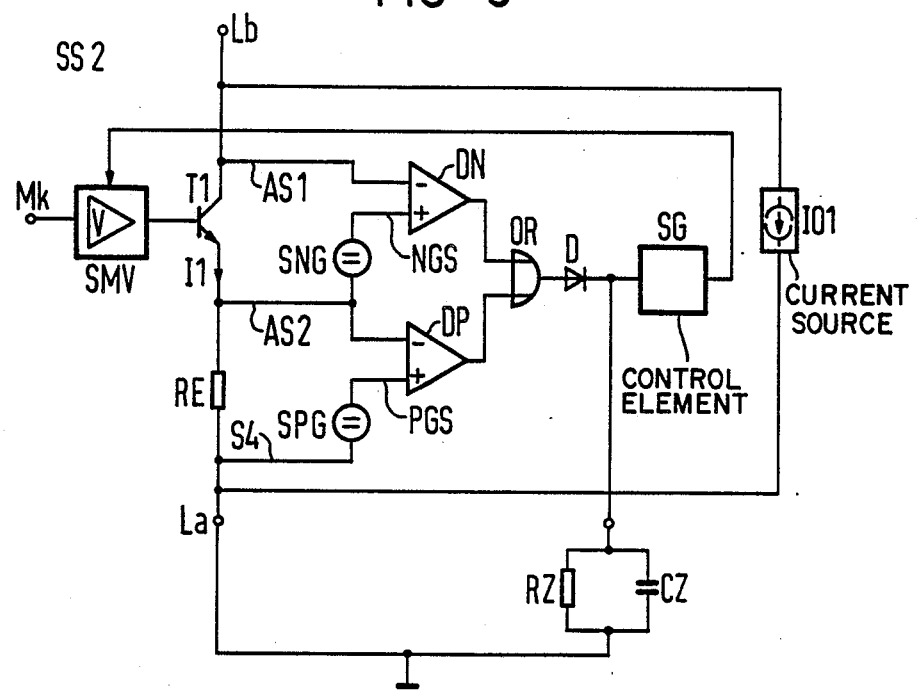
FIG. 3 is a schematic and block circuit diagram of a structural embodiment of the circuit shown in FIG. 2.

FIG. 3 shows an embodiment of the structure of the circuit configuration SS2 according to the invention as shown in FIG. 2. Elements which are identical to those of FIG. 2 are identified by the same reference numerals. The modulation current source I1 is in the form of an n-p-n transistor T1, the base of which is controlled by the controllable microphone amplifier SMV, the collector of which is connected to the terminal Lb and the emitter of which is connected to the terminal La through a current resistor RE which serves as a means for detecting the modulation current. The signal AS1 is picked up at the point connecting the collector of the transistor T1 to the terminal Lb, and the signal AS2 is picked up at the point connecting the emitter of the transistor T1 to the resistor RE. The two signals are applied to the inverting inputs of the comparators DN and DP.

The non-inverting input of the comparator DN is supplied with the characteristic threshold value signal NGS for the negative amplitude threshold value, by a voltage source SNG. In terms of potential, the base of the voltage source SNG depends on the potential of the emitter of the transistor T1 and in the illustrated embodiment it is located at the point connecting the emitter of the transistor T1 to the resistor RE. In other words, it follows the signal AS2. The non-inverting input of the comparator DP is supplied with the characteristic threshold value signal PGS for the positive amplitude limit, by a voltage source SPG. The base of the voltage source SPG having the signal S4 is located at the terminal La.

The outputs of the comparators DN and DP are fed to the inputs of the logical OR element OR. The output of the logical OR element OR is fed through the diode D to the input of the control element SG. The output of the control element SG affects the gain of the controllable microphone amplifier SMV, which can be regulated between a normal value and reduced values with the aid of the control element SG. A terminal is carried to the outside from the point connecting the diode D to the control element SG, and in the illustrated embodiment the parallel circuit of the resistor RZ and the capacitor CZ is connected to that terminal.

In the embodiment according to FIG. 3, the characteristic signals AS1, AS2, NGS and PGS are also in the form of voltages at the most-negative point of the circuit, namely the terminal La. The resistor RE represents the current sensing resistor for the modulation current I1. At the same time, it serves to form the instantaneous line signal AS2, which characterizes the modulation current I1. The characteristic threshold value signal PGS for the positive amplitude limit which is generated by the voltage source SPG, characterizes the minimum modulation current I1 at which the speech circuit configuration SS2 still functions properly. If the instantaneous line signal AS2 drops below the value of the threshold value signal PGS, then the upper amplitude limit has been attained, and the comparator DP switches back the gain of the controllable microphone amplifier SMV through the regulating device formed of the elements OR, D and SG.

The signal AS1 picked up at the collector of the transistor T1 represents the instantaneous line voltage. If the signal AS1 drops below the value of the threshold value signal NGS, which characterizes the minimum line voltage at which the speech circuit configuration SS2 still functions properly, then the lower amplitude limit of the speech circuit configuration has been attained.

In the speech circuit configuration of FIG. 3, the minimum line voltage is the line voltage at which the saturation state occurs in the transistor T1. It is accordingly dependent on the line current, because of the voltage drop at RE and because of the current dependency of the saturation voltage of the transistor T1. However, in the embodiment illustrated in FIG. 3, only the line current dependency based on the resistor RE has been taken into account, because the threshold value signal NGS has the same dependency. In the illustrated embodiment, this is accomplished by generating the threshold value signal NGS by means of the fixed voltage source SNG, the base of which is connected to the emitter of the transistor T1. The current dependency of the saturation voltage of the transistor T1 is not shown in the embodiment of FIG. 3, for the sake of simplicity; however, it is well within the competence of one skilled in the art to take it into account by circuitry provisions. If the value of the instantaneous line signal AS1 drops below the value of the threshold value signal NGS, the comparator DN regulates back the gain of the controllable microphone amplifier SMV, through the elements OR, D and SG.

If the microphone signal drops back to a lower level and if the signals AS1 and AS2 each again assume lower values than the characteristic signals NGS and PGS associated therewith, then the comparators DN or DP and the OR element OR again drop to the low level on the output side. However, the switchover of the switch element SG or the switchover of the gain of the controllable microphone amplifier SMV to the original gain value, is delayed by means of the delay element formed of the resistor RZ and the capacitor CZ, located at the input of the switch element SG. The duration of the delay is adjustable by selecting the resistance and the capacitance of the elements RZ and CZ.

Figure 4:
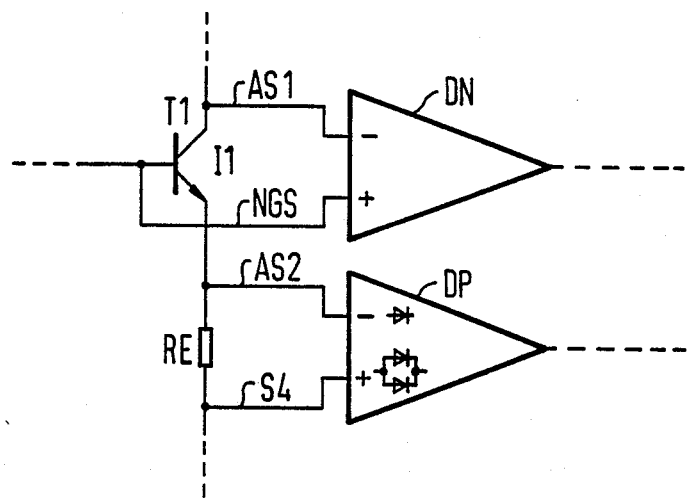
FIG. 4 is a more detailed schematic circuit diagram of a portion of the circuit of FIG. 3.

FIG. 4 shows in a more-detailed portion of the circuit of FIG. 3, with a possible construction of the voltage sources SNG and SPG.

The signal AS1 is picked up at the collector of the transistor T1 and the signal NGS is picked up at the base thereof. The signal NGS depends on the emitter potential of the transistor T1, through the base-to-emitter path of the transistor T1. The criterion for switchover of the comparator DN is the attainment of saturation of the transistor T1, if the base-to-emitter voltage becomes greater than the collector-to-emitter voltage of the transistor T1.

The voltage source SPG is integrated in the form of a built-in offset with the comparator DP. The non-inverting input of the comparator DP is therefore connected directly to the base of the resistor RE or the terminal La. For example, the offset for the comparator DP may be formed by means of two diodes of different dimensions, as shown.

The foregoing is a description corresponding in substance to German application No. P 36 33 232.1, dated Sept. 30, 1986, the International priority of which is being claimed for the instant application, and which is hereby made part of this application. Any material discrepancies between the foregoing specification and the aforementioned corresponding German application are to be resolved in favor of the latter.

We claim:

1. In a telephone set having an electronic speech circuit, including a modulation current source, two line terminals connecting the modulation current source to a telephone line, and a microphone amplifier having an input connected to a microphone terminal and an output controlling the modulation current source for generating a line signal, a method for gain control which comprises the steps of:
   (a) deriving from the modulation current source measurement signals and threshold value signals;
   (b) comparing the measurement signals and threshold value signals with one another;
   (c) regulating the gain of the microphone amplifier as a function of the result of the comparison; and
   (d) further deriving dynamically the threshold value signals as a function of both the current and voltage of the telephone line as threshold value signals for upper and lower current amplitude limits of the electronic speech circuit.

2. Method according to claim 1, which comprises further deriving the measurement signals from the line signal.

3. Method according to claim 1, which comprises further deriving the measurement signals from the current and the voltage of the telephone line.

4. Method according to claim 1, which comprises further deriving the measurement signals from voltage drops of the modulation current source.

5. Method according to claim 1, which comprises further deriving the threshold value signals as a function of the current amplitude limits of the electronic speech circuit in the form of a minimum threshold value of the voltage signals.

6. Method according to claim 1, which comprises further deriving the threshold value signals from fixed current amplitude limits of the electronic speech circuit.

7. Method according to claim 1, which comprises defining the threshold value signals by means of fixed voltage sources.

8. Method according to claim 1 including a regulating device for reducing the gain of the microphone amplifier in response to the measurement signals deviating from the threshold value signals.

9. In a telephone set having an electronic speech circuit, including a modulation current source, two line terminals connecting the modulation current source to a telephone line, and a microphone amplifier having an input connected to a microphone terminal and an output controlling the modulation current source for generating a line signal, a method for gain control which comprises the steps of:
 (a) deriving from the modulation current source measurement signals and threshold value signals;
 (b) comparing the measurement signals and threshold value signals with one another;
 (c) regulating the gain of the microphone amplifier as a function of the result of the comparison; and
 (d) increasing the gain of the microphone amplifier with a time delay element when the measurement signals deviate from the threshold value signals.

10. Apparatus for gain control of telephone sets having an electronic speech circuit, comprising a modulation current source, two line terminals connecting said modulation current source to a telephone line, a microphone terminal, a microphone amplifier having an input connected to said microphone terminal and an output connected to and controlling said modulation current source for generating a line signal, means connected to said modulation current source for generating measurement signals and threshold value signals, a comparison device connected to said generating means for comparing the measurement signals and threshold value signals with one another, a regulating device connected to said comparison device and to said microphone amplifier for regulating the gain of said microphone amplifier in response to said comparison device; and wherein said generating means for the threshold value signals operate to dynamically define upper and lower current amplitude limits of the speech circuit as a function of both current and voltage of the telephone line.

11. Apparatus according to claim 10, wherein said generating means for the measurement signals detect the line signal and generate at least one of current and voltage measurement signals.

12. Apparatus according to claim 10, wherein said generating means for the measurement signals detect at least one of the current and voltage of the telephone line and the output voltage and the output current of said modulation current source.

13. Apparatus according to claim 10, wherein said generating means for the threshold value signals generate threshold value voltage signals dependent on current amplitude limits of the speech circuit.

14. Apparatus according to claim 10, wherein said generating means for the threshold value signals define fixed current amplitude limits of the speech circuit.

15. Apparatus according to claim 10, wherein said generating means for the threshold value signals include fixed voltage sources.

16. Apparatus for gain control of telephone sets having an electronic speech circuit, comprising a modulation current source, two line terminals connecting said modulation current source to a telephone line, a microphone terminal, a microphone amplifier having an input connected to said microphone terminal and an output connected to and controlling said modulation current source for generating a line signal, means connected to said modulation current source for generating measurement signals and threshold value signals, a comparison device connected to said generating means for comparing the measurement signals and threshold value signals with one another, and a regulating device connected to said comparison device and to said microphone amplifier for regulating the gain of said microphone amplifier in response to said comparison device; and wherein said comparison device includes comparators having inputs respectively receiving the measurement signals and the threshold value signals.

17. Apparatus according to claim 16, wherein said modulation current source includes a transistor having an input circuit connected to and controlled by said microphone amplifier, an output circuit determining the line signal, and a base and a collector respectively connected to said inputs of one of said comparators.

18. Apparatus according to claim 16, wherein said comparison device has an offset, and said modulation current source includes a current sensor resistor having terminals respectively connected to said inputs of said comparison device.

19. Apparatus according to claim 16, wherein said comparators have outputs, and said regulating device has an input side including a logic element connected to said outputs of said comparison device and an output side including a control element connected to said logic element and to said microphone amplifier.

20. Apparatus according to claim 19, wherein said regulating device includes a delay circuit connected between said logic element and said control element.

21. Apparatus according to claim 20, including a rectifier connected between said delay circuit and said logic element.

22. Apparatus for gain control of telephone sets having an electronic speech circuit, comprising a modulation current source, two line terminals connecting said modulation current source to a telephone line, a microphone terminal, a microphone amplifier having an input connected to said microphone terminal and an output connected to and controlling said modulation current source for generating a line signal, means connected to said modulation current source for generating measurement signals and threshold value signals, a comparison device connected to said generating means for comparing the measurement signals and threshold value signals with one another, and a regulating device connected to said comparison device and to said microphone amplifier for regulating the gain of said microphone amplifier in response to said comparison device; and wherein said comparison device includes differential amplifiers having inputs respectively receiving the measurement signals and the threshold value signals.

23. Apparatus according to claim 22, wherein said modulation current source includes a transistor having an input circuit connected to and controlled by said microphone amplifier, an output circuit determining the line signal, and a base and a collector respectively connected to said inputs of one of said differential amplifiers.

24. Apparatus according to claim 22, wherein each of said differential amplifiers has an offset, and said modulation current source includes a current sensor resistor having terminals respectively connected to said inputs of said differential amplifiers.

25. Apparatus according to claim 22, wherein said differential amplifiers have outputs, and said regulating device has an input side including a logic element connected to said outputs of said differential amplifiers and an output side including a control element connected to said logic element and to said microphone amplifier.

26. Apparatus according to claim 25, wherein said regulating device includes a delay circuit connected between said logic element and said control element.

27. Apparatus according to claim 26, including a rectifier connected between said delay circuit and said logic element.

* * * * *